April 28, 1936.                J. B. TIEDEMANN                2,039,128
                           POWER PRESS DRIVE AND CONTROL
                           Filed Dec. 3, 1934        2 Sheets-Sheet 2
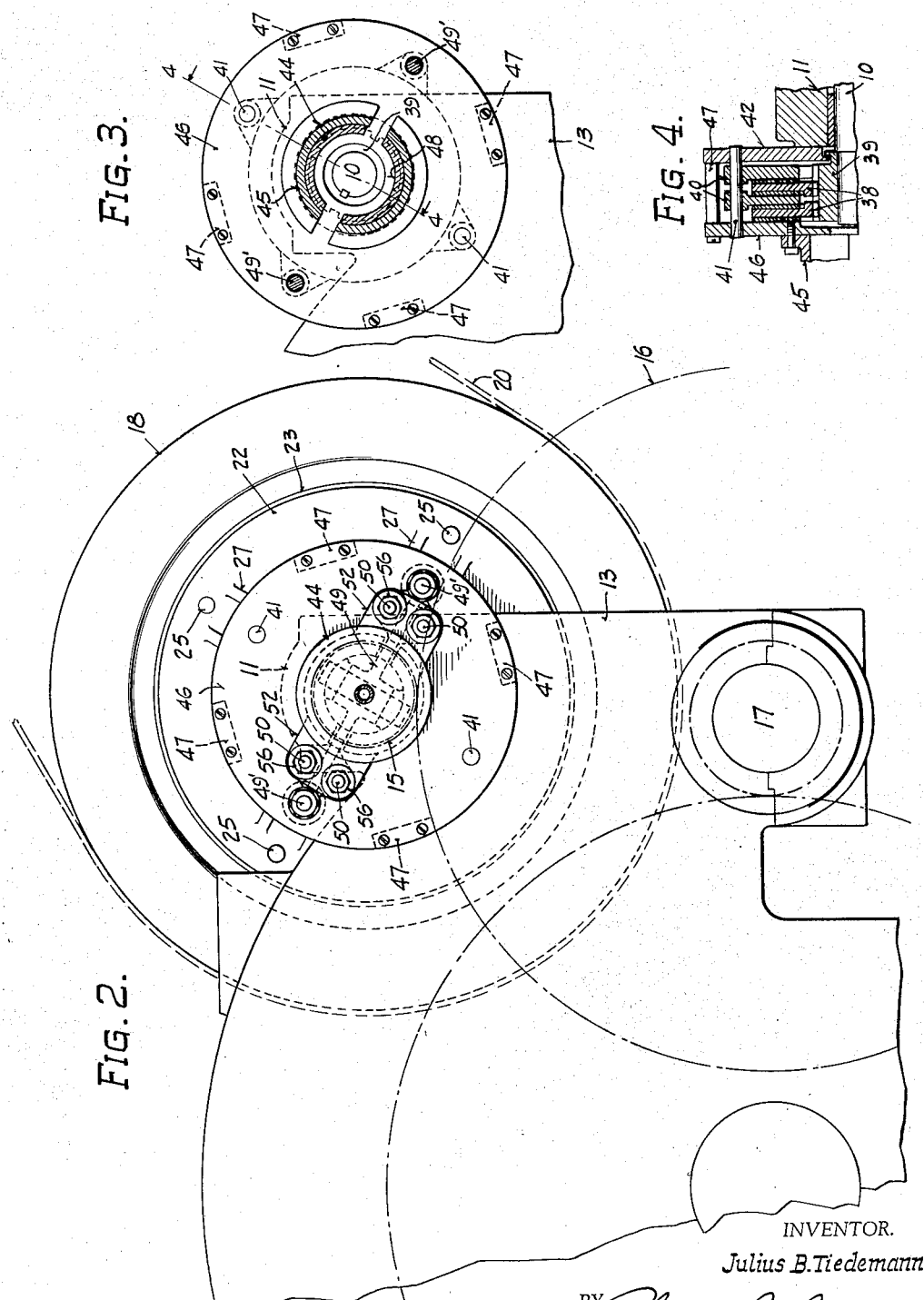
INVENTOR.
Julius B. Tiedemann
BY
ATTORNEY.

Patented Apr. 28, 1936

2,039,128

UNITED STATES PATENT OFFICE 2,039,128

POWER PRESS DRIVE AND CONTROL

Julius B. Tiedemann, Milwaukee, Wis., assignor to A. O. Smith Corporation, Milwaukee, Wis., a corporation of New York Application December 3, 1934, Serial No. 755,843

4 Claims. (Cl. 192—18)

The present invention relates to devices for the driving and controlling of power presses, and more particularly relates to mechanisms especially applicable to heavy presses of the flywheel type used in the forming of metal parts.

This invention aims to provide simple and efficient mechanisms by which the driving flywheel of a press is engaged with a driven shaft employed to operate the press and by which said shaft has braking effort applied to it to stop the operation of said press, and to do so in a manner which utilizes a minimum number of parts and is readily applicable to new or existing presses and is readily accessible for maintenance and adjustment, the adjustment being possible while the press is in operation.

A more detailed understanding of the accomplishments of the present invention may be obtained by reference to the attached drawings of which;

Fig. 2 is an end view of the mechanism of Fig. 1 viewed from the left and showing its location on a power press;

Fig. 3 is a sectional view of the mechanism taken on line 3—3 of Fig. 1; and

Fig. 4 is a fragmentary sectional view taken on the line 4—4 of Fig. 3.

Figure 1:
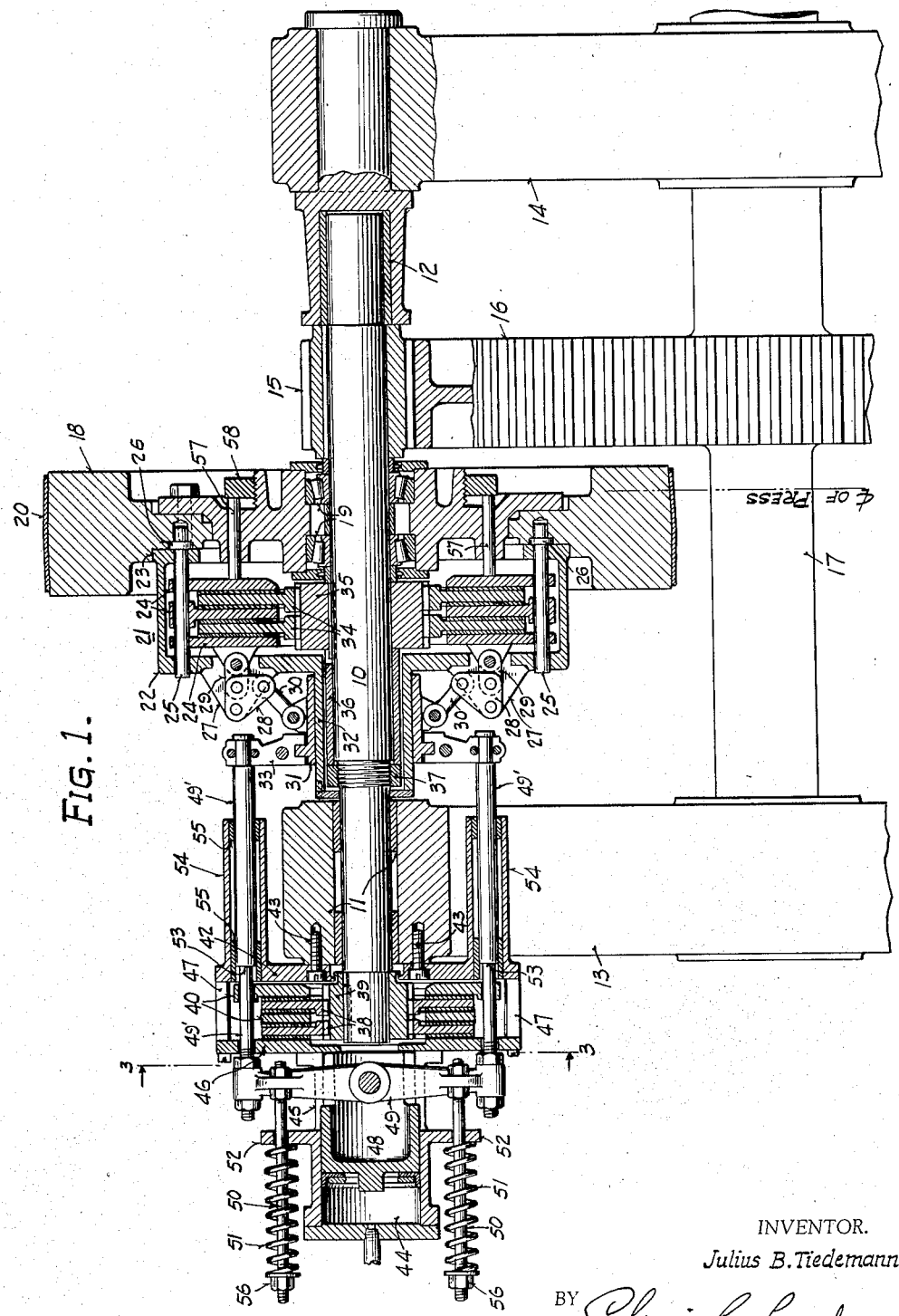
Fig. 1 is a longitudinal view partly in section of a press drive and operating mechanism embodying the present invention.

Referring to the drawings: A driving shaft 10 for a heavy metal forming press is shown journaled in bearings 11 and 12. Bearing 11 is located in a press frame pedestal 13 and bearing 12 is shown as an overhung bearing member clamped in press pedestal 14. Pinion 15 is keyed to shaft 10 and engages gear 16 to drive a counter shaft 17 geared to the main press shaft.

A heavy driving flywheel 18 is mounted by means of roller bearings 19 for rotation upon the shaft 10. Flywheel 18 is continually driven by a motor or other power means, not shown, through the medium of belt 20 engaging its rim.

Clutch 21 is provided to connect flywheel 18 and shaft 10 to rotate the latter and drive the press when desired. Clutch 21 has a housing 22 which is centered on flywheel 18 by the annular shoulder at 23. Friction clutch discs 24 are carried by housing 22 and caused to rotate with said housing and flywheel 18 through the means of pins 25 which are assembled with shoulders 26 arranged between clutch housing 22 and flywheel 18. Housing 22 carries lugs 27. Clutch operating toggle members 28 and 29 are pivotally attached to lugs 27 and the adjacent clutch plate 24 respectively. Clutch toggle members 28 and 29 are operated through the medium of connecting links 30 and sleeve 31 which latter is free to slide on the cylindrical portion 32 of housing 22. The movement of sleeve 31 is accomplished by means of yoke 33. Clutch 21 also has plates 34 which are mounted upon and caused to turn with shaft 10 by means of annular block 35 which is keyed to shaft 10 and held against endwise movement by means of sleeve 36 and nut 37. Nut 37 is threaded upon shaft 10 and clamps sleeve 36, block 35, and bearings 19 of flywheel 18 all in a tight assembly against pinion 15 which has a drive fit upon said shaft. Clutch discs 24 are free to slide endwise upon pins 25 and discs 34 are likewise free to slide endwise upon block 35.

In order to provide a brake for the shaft 10 and the press drive that is readily removable and easily accessible and adjustable, shaft 10 is extended beyond bearing 11 and brake discs 38 mounted thereon and arranged to turn with shaft 10 through the means of annular block 39. Brake discs 38 are mounted in a manner similar to the mounting of clutch discs 34. Non-rotating brake discs 40 are slidable on rods 41 which are fixed in the brake housing. The inner plate 42 of the brake housing is secured to the bearing 11 by means of studs 43.

For the operation of the clutch a pneumatic cylinder 44 is mounted axially of driving shaft 10 and its supporting frame 45 extends toward the press and is carried by a flange plate 46 which also constitutes the outer housing member and braking disc of the brake clutch. Flange plate 46 and the inner brake housing plate 42 are spaced apart and secured together by means of spacers 47.

Clutch operating piston 48 is arranged to slide in cylinder 44 and has pivoted to an extension or skirt thereof an equalizing arm 49 which has secured thereto clutch operating rods 49' which are in turn secured to clutch operating yoke 33.

As illustrated in the drawings there are also four spring tension rods 50 secured to the equalizing arm 49. Rods 50 carry springs 51 which seat against flanges 52 on cylinder 44. These springs 51 act to release the clutch when the pressure in cylinder 44 is released and also to apply the brake by means of shoulders 53 provided upon rods 49' engaging the rear disc 40 and moving it forward on its supporting rods 41. Sleeve extensions 54 are shown welded to the back of flange plate 42 to provide spaced bearings 55 for longitudinal movement only of rods 49' thus preventing rotation of the yoke 33.

Nuts 56 on spring tensioning rods 50 are provided to adjust the springs 51 suitably to perform their functions of releasing the clutch and applying the brake. It is apparent that such adjustment can be made while the press is in operation without the necessity of interrupting the productive operation thereof. It is also apparent that by the removal of only a very small number of nuts and studs the entire assembly of actuating cylinder, piston, return springs, and brake can be readily removed for the purposes of maintenance.

The adjustment of the clutch discs is accomplished by pins 57 and adjusting nut 58. By the employment of a toggle for operating the clutch a relatively low pressure is necessary to engage said clutch, therefore the sliding friction between clutch operating yoke 33 and the rotating sleeve 31 is low for holding the clutch in engagement. The pressure in cylinder 44 is counter balanced substantially by the spring pressure of springs 51.

Those skilled in the art can make numerous modifications of the mechanisms as illustrated in the drawings without departing from the spirit of the invention.

I claim:

1. In a press drive and control a press driving shaft with a driving flywheel and an interconnecting clutch therefor mounted thereon between supporting bearings, a fluid pressure clutch operating cylinder and piston located axially of said shaft but beyond the end thereof, and an equalizing member attached to the operating member of said cylinder and piston and connected to an operating member of said clutch by a plurality of laterally spaced connecting members.

2. In a press drive and control a drive shaft for the press, a flywheel rotatably mounted upon said shaft, a toggle operated clutch for connecting said flywheel and said shaft, an end bearing for said shaft, a multiple disc brake for said shaft associated with said shaft beyond said end bearing and remote from said clutch, a fluid pressure cylinder and piston for operating said clutch arranged beyond the end of said shaft and axially aligned therewith, connecting members arranged laterally of said bearing and between the operating member of said piston and cylinder structure and said toggle mechanism for operating said clutch, resilient means arranged to be tensioned by the movement of the piston or cylinder at the time of engaging said clutch, said resilient means being arranged to disengage said clutch when the pressure in said cylinder is relieved, and means on said connecting members to engage said brake and stop said shaft and press upon the clutch disengaging movement of said resilient means.

3. In a press drive and control, an end bearing support for a driving shaft for the press, a driving flywheel arranged on said shaft on the press side of said end bearing, a friction clutch associated with said flywheel and shaft to drive the latter, means beyond the end of said shaft and bearing for engaging said clutch and a plurality of members arranged laterally of said bearing for connecting said clutch engaging means and said clutch.

4. A power press driving and braking mechanism comprising a shaft for driving the power press and journaled in at least two main bearings, a constantly rotating driving flywheel concentrically arranged upon said shaft and free to rotate thereon between two of said bearings, a friction clutch arranged between said flywheel and said shaft to cause said shaft to rotate with said flywheel, a clutch operating mechanism, a friction brake member for said shaft, a rotatable element of which is secured to said shaft, a non-rotatable element of which is secured to a fixed member of said press, a pneumatic cylinder and piston arranged axially of said shaft but beyond the end of said shaft and its corresponding bearing for the engagement of said clutch, connecting members arranged to connect said clutch closing piston and cylinder and said clutch operating mechanism spring means arranged to cause said connecting means to move in a reverse direction upon the release of pressure in said cylinder and thereby cause said clutch to disengage, and means upon said connecting means to engage said brake and stop the rotation of said shaft responsive to a movement under the action of spring means.

JULIUS B. TIEDEMANN.